(12) United States Patent
Harada et al.

(10) Patent No.: US 11,930,501 B2
(45) Date of Patent: Mar. 12, 2024

(54) TERMINAL, COMMUNICATION METHOD, BASE STATION, AND SYSTEM FOR RECEIVING SYNCHRONIZATION AND/OR BROADCAST SIGNALS IN A GIVEN TRANSMISSION TIME INTERVAL

(71) Applicant: NTT DOCOMO, INC., Tokyo (JP)

(72) Inventors: Hiroki Harada, Tokyo (JP); Kazuki Takeda, Tokyo (JP); Yoshihisa Kishiyama, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 549 days.

(21) Appl. No.: 16/087,852

(22) PCT Filed: Mar. 24, 2017

(86) PCT No.: PCT/JP2017/011899
§ 371 (c)(1),
(2) Date: Sep. 24, 2018

(87) PCT Pub. No.: WO2017/164348
PCT Pub. Date: Sep. 28, 2017

(65) Prior Publication Data
US 2020/0305122 A1 Sep. 24, 2020

(30) Foreign Application Priority Data

Mar. 25, 2016 (JP) ................. 2016-062596

(51) Int. Cl.
*H04L 47/76* (2022.01)
*H04B 17/382* (2015.01)
(Continued)

(52) U.S. Cl.
CPC .......... *H04W 72/23* (2023.01); *H04B 17/382* (2015.01); *H04L 47/70* (2013.01);
(Continued)

(58) Field of Classification Search
CPC ............ H04W 72/04; H04W 72/0406; H04W 72/042; H04W 72/044; H04W 72/005;
(Continued)

(56) References Cited

U.S. PATENT DOCUMENTS 9,020,051 B2  4/2015 Lee et al.
2008/0287137 A1  11/2008 Li et al.
(Continued)

FOREIGN PATENT DOCUMENTS

CN 104756432 A 7/2015
EP 3314952 A1 5/2018
(Continued)

OTHER PUBLICATIONS

Definition: "number," Web page <http://merriam-webster.com:80/dictionary/number>, 2 pages, Mar. 14, 2016, retrieved from Internet Archive The Wayback Machine <http://web.archive.org/web/20160314162232/http:// merriam-webster.com:80/dictionary/number> on Dec. 28, 2021. (Year: 2016).*

(Continued)

*Primary Examiner* — Salvador E Rivas
(74) *Attorney, Agent, or Firm* — Bergman Watanabe & Burton LLP

(57) ABSTRACT

The present invention is designed to realize appropriate communication in next generation communication systems. a control section that controls communication by using a radio frame that includes a plurality of transmission time intervals (TTIs), in which the downlink and the uplink can be switched, and a given TTI, which is for DL transmission and which is configured in a given cycle, and a receiving section that receives a synchronization signal and a broadcast signal in the given TTI are provided.

4 Claims, 11 Drawing Sheets

(51) Int. Cl.
| | |
|---|---|
| *H04L 47/70* | (2022.01) |
| *H04W 48/10* | (2009.01) |
| *H04W 48/12* | (2009.01) |
| *H04W 56/00* | (2009.01) |
| *H04W 72/044* | (2023.01) |
| *H04W 72/23* | (2023.01) |
| *H04W 72/50* | (2023.01) |
| *H04L 5/00* | (2006.01) |
| *H04W 16/04* | (2009.01) |
| *H04W 16/10* | (2009.01) |
| *H04W 72/30* | (2023.01) |

(52) U.S. Cl.
CPC ............ *H04L 47/76* (2013.01); *H04W 48/10* (2013.01); *H04W 48/12* (2013.01); *H04W 56/001* (2013.01); *H04W 56/0015* (2013.01); *H04W 72/044* (2013.01); *H04W 72/50* (2023.01); *H04W 74/0833* (2013.01); *H04L 5/0048* (2013.01); *H04W 16/04* (2013.01); *H04W 16/10* (2013.01); *H04W 72/30* (2023.01)

(58) Field of Classification Search
CPC . H04W 72/0446; H04W 48/10; H04W 48/12; H04W 56/0015; H04W 56/001; H04W 74/0833; H04W 36/00725; H04W 36/0007; H04W 72/30; H04W 72/50; H04W 72/52; H04W 28/16; H04W 16/04; H04W 16/10; H04L 5/0048; H04L 47/70; H04L 47/76; H04B 17/382
See application file for complete search history.

(56) References Cited

U.S. PATENT DOCUMENTS

| | | | | |
|---|---|---|---|---|
| 2010/0128675 A1* | 5/2010 | Kishiyama | ............ | H04L 5/0053 370/328 |
| 2010/0296467 A1* | 11/2010 | Pelletier | ................ | H04L 5/0048 370/329 |
| 2012/0026958 A1 | 2/2012 | Chou | | |
| 2014/0010131 A1 | 1/2014 | Gaal et al. | | |
| 2014/0226638 A1* | 8/2014 | Xu | ......................... | H04L 1/0013 370/336 |
| 2015/0359003 A1* | 12/2015 | Kim | .................. | H04W 56/0045 370/336 |
| 2015/0373743 A1* | 12/2015 | Kim | .................. | H04L 27/26132 370/329 |
| 2016/0269163 A1* | 9/2016 | Wong | .................... | H04W 72/23 |
| 2016/0308637 A1* | 10/2016 | Frenne | ................ | H04J 11/0069 |
| 2016/0345216 A1 | 11/2016 | Kishiyama et al. | | |
| 2016/0353440 A1* | 12/2016 | Lee | .................. | H04W 72/0453 |
| 2016/0374109 A1* | 12/2016 | Rico Alvarino | ....... | H04H 20/16 |
| 2017/0288831 A1* | 10/2017 | Cezanne | ............ | H04W 56/001 |
| 2017/0290008 A1* | 10/2017 | Tooher | ................. | H04L 1/1893 |
| 2018/0041325 A1* | 2/2018 | Lee | ....................... | H04L 5/0087 |
| 2018/0176065 A1* | 6/2018 | Deng | ..................... | H04B 7/088 |
| 2018/0220419 A1* | 8/2018 | Takeda | .................... | H04L 5/005 |
| 2018/0255550 A1* | 9/2018 | Takeda | ................. | H04W 48/16 |
| 2019/0029003 A1 | 1/2019 | Takeda et al. | | |
| 2019/0037609 A1 | 1/2019 | Harada et al. | | |
| 2020/0059878 A1* | 2/2020 | Huang | ................ | H04W 72/046 |
| 2021/0136823 A1* | 5/2021 | Kim | .................. | H04W 74/0891 |
| 2022/0278885 A1 | 9/2022 | Deng et al. | | |

FOREIGN PATENT DOCUMENTS

| | | |
|---|---|---|
| EP | 3393190 A1 | 10/2018 |
| EP | 3399811 A1 | 11/2018 |
| EP | 3404992 A1 | 11/2018 |
| JP | 2009-111624 A | 5/2009 |
| JP | 2013-524569 A | 6/2013 |
| JP | 2015-164281 A | 9/2015 |
| WO | 2015/080646 A1 | 6/2015 |
| WO | 2016/017356 A1 | 2/2016 |

OTHER PUBLICATIONS

Alcatel-Lucent Shanghai Bell et al.; "D2D communication channel design for broadcast"; 3GPP TSG RAN WG1 Meeting #76, R1-140173; Prague, Czech Republic, Feb. 10-14, 2014 (8 Pages).
Extended European Search Report issued in counterpart European Patent Application No. 17770388.1, dated Sep. 4, 2019 (11 Pages).
International Search Report issued in PCT/JP2017/011899 dated Jun. 6, 2017 (2 pages).
Written Opinion of the International Searching Authority issued in PCT/JP2017/011899 dated Jun. 6, 2017 (4 pages).
Samsung; "Dynamic reconfiguration of TDD UL-DL configuration"; 3GPP TSG RAN WG1 Meeting #69, R1-122267; Prague, Czech Republic; May 21-25, 2012 (2 pages).
NTT DOCOMO, Inc.; "Initial views on frame structure for NR access technology"; 3GPP TSG RAN WG1 Meeting #84bis, R1-163112; Busan, Korea; Apr. 11-15, 2016 (8 pages).
BGPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Office Action issued in the counterpart European Patent Application No. 17770388.1, dated Dec. 17, 2020 (6 pages).
Office Action issued in European Application No. 17770388.1, dated Mar. 11, 2021 (8 pages).
3GPP TSG GERAN1 Adhoc#3 on FS_IoT_LC, Adhoc #1 on uPoD; TDoc GPC150343; "Some considerations for PSCH and PBCH;" LG Electronics; Jun. 29-Jul. 2, 2015; Kista, Sweden (3 pages).
Office Action issued in Japanese Application No. 2018-507425; dated Mar. 30, 2021 (6 pages).
1 Office Action issued in Chinese Application No. 201780019740.1; dated Jul. 30, 2021 (13 pages).
Office Action issued in Chinese Application No. 201780019740.1; dated Jan. 4, 2022 (15 pages).
Office Action issued in Indian Application No. 201817035364 dated Nov. 8, 2021 (6 pages).
Office Action issued in the counterpart European Patent Application No. 17770388.1, dated Dec. 9, 2021 (8 pages).
Office Action issued in the counterpart European Patent Application No. 17770388.1, dated Mar. 30, 2023 (9 pages).
Office Action issued in New Zealand Application No. 746536, dated Aug. 18, 2023 (4 pages).

* cited by examiner

TERMINAL, COMMUNICATION METHOD, BASE STATION, AND SYSTEM FOR RECEIVING SYNCHRONIZATION AND/OR BROADCAST SIGNALS IN A GIVEN TRANSMISSION TIME INTERVAL

TECHNICAL FIELD

The present invention relates to a user terminal, a radio base station and a radio communication method in a next-generation mobile communication system.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-Advanced," "LTE Rel. 10," "Rel. 11" or "Rel. 12," etc.) have been drafted for further broadbandization and increased speed beyond LTE (also referred to as "LTE Rel. 8" or "Rel. 9"), and successor systems of LTE (also referred to as, for example, "FRA" (Future Radio Access), "5G" (5th generation mobile communication system), "LTE Rel. 13," "Rel. 14," and so on) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. In addition, in CA, multiple CCs under the same radio base station (eNB: eNodeB) are configured in a user terminal (UE: User Equipment).

Meanwhile, in LTE Rel. 12, dual connectivity (DC), in which multiple cell groups (CGs) formed by different radio base stations are configured in a UE, is also introduced. Each cell group is comprised of at least one cell (CC). In DC, since multiple CCs of different radio base stations are integrated, DC is also referred to as "inter-eNB CA."

Also, in LTE Rel. 8 to 12, frequency division duplex (FDD), in which downlink (DL) transmission and uplink (UL) transmission are made in different frequency bands, and time division duplex (TDD), in which downlink transmission and uplink transmission are switched over time and made in the same frequency band, are introduced. In TDD, whether to use each subframe for the uplink (UL) or for the downlink (DL) is decided strictly based on UL/DL configurations.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Future radio communication systems (for example, 5G) are under study to use wide-band frequency spectra in order to meet the demands for ultra-high speed, large capacity, ultra-low delay and so on. Furthermore, future radio communication systems are required to cope with environments where a huge number of devices connect with the network simultaneously.

For example, in future radio communication systems, there is a possibility that communication will be carried out in a high frequency band (for example, in a band of several tens of GHz) where it is easier to secure a wide band, or communication of a relatively small volume, such as communication for use for IoT (Internet of Things), MTC (Machine Type Communication), M2M (Machine To Machine) and so on, will be carried out. The demand for D2D (Device To Device) and V2V (Vehicular To Vehicular) communication, which require low-delay communication, is also increasing.

To fulfill the requirements for the above-mentioned various kinds of communication, studies are going on to design a new communication access scheme (which may be referred to as "5G RAT (Radio Access Technology)," "new RAT," etc.) that is suitable for a high frequency band. Furthermore, in order to provide support for the above-mentioned communication, there is a possibility that different initial access operation from that of LTE systems will be required in new RAT. In this case, if the radio communication schemes (for example, the initial access method) used in existing radio communication systems (for example, LTE Rel. 8 to 12) are applied to the new communication access scheme on an as-is basis, there is a risk that communicate may not be carried out adequately.

The present invention has been made in view of the above, and it is therefore an object of the present invention to provide a user terminal, a radio base station and a radio communication method, whereby communication can be carried out adequately in next-generation communication systems.

Solution to Problem

According to one aspect of the present invention, a user terminal has a control section that controls communication by using a radio frame that includes a plurality of transmission time intervals (TTIs), in which downlink and uplink are able to switched, and a given TTI, which is for DL transmission and which is configured in a given cycle, and a receiving section that receives a synchronization signal and a broadcast signal in the given TTI.

Advantageous Effects of Invention

According to the present invention, it is possible to communicate adequately in next-generation communication systems.

DESCRIPTION OF EMBODIMENTS

To provide an access scheme for use in new future communication systems (which may be referred to as "5G RAT," "new RAT," etc.), studies are in progress to enhance the access schemes (which may be referred to as "LTE RAT," "LTE-based RAT," etc.) used in existing LTE/LTE-A systems.

In 5G RAT, different radio frames and/or different subframe formats than LTE RAT may be used. For example, a radio frame format, in which at least one of the subframe duration, the symbol duration, the subcarrier spacing and the system/bandwidth is different from existing LTE (LTE Rel. 8 to 12), can be used as a radio frame format for 5G RAT.

Note that subframes may be referred to as "transmission time intervals (TTIs)." For example, the duration of a TTI (subframe) in LTE Rel. 8-12 is one ms, comprised of two time slots. A TTI is the time unit for transmitting channel-encoded data packets (transport blocks), and serves as the unit of processing in scheduling, link adaptation, and so on.

To be more specific, while new radio parameters are stipulated in 5G RAT, for example, the method of using communication parameters that define LTE radio frames (for example, the subcarrier spacing, the bandwidth, the symbol duration, etc.) by multiplying these parameters by a constant (for example, by N, by 1/N, etc.) based on LTE RAT numerologies, is under study. Here, a "numerology" refers to a set of communication parameters that characterize the design of signals in a given RAT, or the design of the RAT, and so on. Note that multiple numerologies may be defined and used in one RAT.

Also, when multiple numerologies vary, this means that, for example, at least one of following (1) to (6) varies, but this is by no means limiting: (1) the subcarrier spacing; (2) the duration of CPs (Cyclic Prefixes); (3) the duration of symbols; (4) the number of symbols per TTI; (5) the duration of TTIs; and (6) the filtering process, the windowing process, etc.

In 5G RAT, a very wide range of frequencies (for example, from 1 GHz to 100 GHz) are target carrier frequencies, and, depending on what conditions are required for each use, it might occur that multiple numerologies with different symbol durations, subcarrier spacing and so on, are supported and co-present. One example of numerology to be employed in 5G RAT may be configured such that, based on LTE RAT, the subcarrier spacing, the bandwidth and so on are multiplied by N (for example, N>1), and the symbol duration is multiplied by 1/N.

Figure 1:
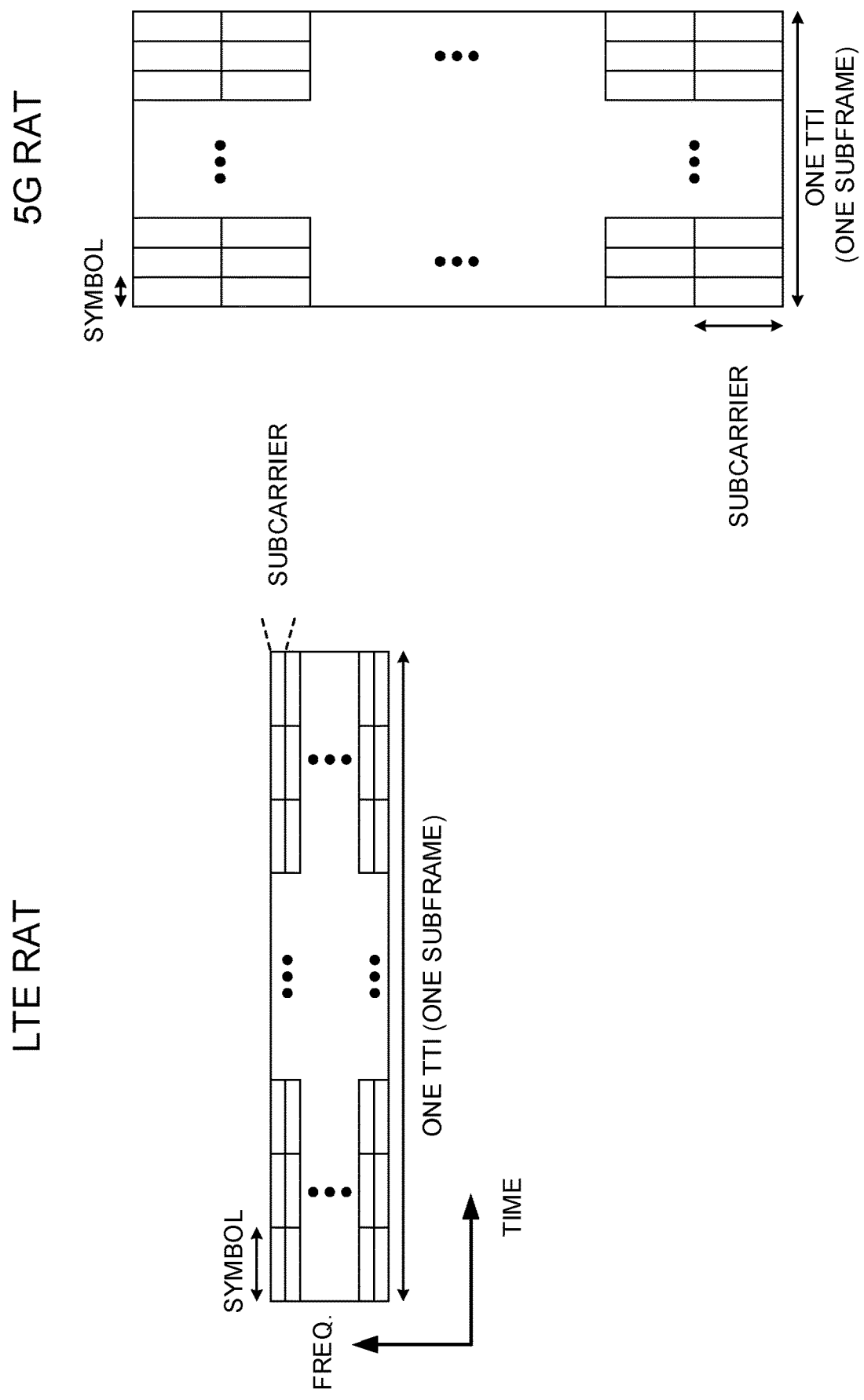
FIG. 1 is a diagram to show an example of the subframe format for LTE RAT and the subframe format for 5G RAT.

FIG. 1 is a diagram to show an example of the subframe format for LTE RAT and the subframe format for 5G RAT. The LTE RAT shown in FIG. 1 uses an existing LTE subframe format, in which the control unit is one ms (fourteen OFDM (Orthogonal Frequency Division Multiplexing) symbols/SC-FDMA (Single-Carrier Frequency Division Multiple Access) symbols) and 180 kHz (twelve subcarriers).

Furthermore, the 5G RAT shown in FIG. 1 uses a subframe format (TTI format), in which, compared with LTE RAT, the subcarrier spacing is wide, and the symbol duration is short. By making the TTI duration short, it is possible to reduce the control-induced processing delay, and shorten the latency. Note that a TTI that is shorter than the TTI used in LTE (for example, a TTI that is less than one ms) may be referred to as a "short TTI."

According to the format for 5G RAT shown in FIG. 1, the TTI duration can be made short, so that it is possible to shorten the time required for transmission and receipt, and this in turn makes it easier to achieve low latency. In addition, by making the subcarrier spacing and the system bandwidth large compared to existing LTE, the impact of phase noise in high frequency bands can be reduced. By this means, it is possible to introduce high-frequency bands (for example, a band of several tens of GHz), where it is easier to reserve a wide band, to 5G RAT, and for example, realize high-speed communication adequately, based on massive MIMO (Multiple Input Multiple Output), which uses super-multi-element antennas.

By using a super-multi-element antenna, beams (antenna directivities) can be formed by controlling the amplitude and/or the phase of signals that are transmitted and received via each element. This process is also referred to as "beam forming (BF)," and can reduce the propagation loss.

As another example of numerology, it may be possible to employ a format, in which the subcarrier spacing, the bandwidth and so on are made 1/N, and the symbol duration is made N times as large. According to this format, the overall symbol duration increases, so that, even when the ratio of the CP duration to the overall symbol duration is constant, the CP duration can be lengthened. This enables radio communication that is more robust against fading on communication paths.

In 5G RAT, the unit of control is not limited to conventional one resource block (RB) pair (fourteen symbols× twelve subcarriers). For example, the unit of control may be a new unit of a predetermined field (which may be referred to as, for example, an "enhanced RB (eRB)"), which is defined as a radio resource field that is different from conventional one RB, or may be a unit of multiple RBs.

Now, in new RAT (5G new RAT), communication may be carried out using, for example, at least one of dynamic TDD (full dynamic TDD), in which uplink and downlink transmission and receipt are switched dynamically at short time intervals, massive MIMO, which uses the above-mentioned super-multi-element antennas, multiple numerologies, and so on. In communication using multiple numerologies, it might occur that a plurality of different symbol designs and/or TTI formats are supported, depending on frequencies, service requirements, and so on.

When a user terminal connects with a new RAT and communicates, the user terminal needs to connect with base stations that use the new RAT (5G base stations, cells, etc.). The following scenarios are possible modes of processing to allow a user terminal to connect with a 5G base station:

(1) The process to allow a user terminal in an unconnected state to a network (NW) to gain initial access to a 5G cell;
(2) The process to allow a user terminal connected to an LTE network to gain initial access to a 5G cell; and
(3) The process to allow a user terminal connected to a 5G cell to additionally connect with another 5G cell.

Here, "initial access" refers to the minimum operation that is required before a NW and a user terminal identify a common ID (for example, C-RNTI) and enter the state in which the NW and the user terminal can transmit and receive data.

As mentioned earlier, for future communication systems, studies are in progress to communicate by using multi-element beamforming, dynamic TDD, or multiple numerologies. Therefore, in the above scenarios (1) to (3) of initial access to a 5G cell, there is a possibility that different operating procedures from the initial access in LTE systems will be required.

For example, when using a predetermined frequency field (for example, a high frequency), it is possible to apply beamforming using multiple antenna elements, to both the uplink and the downlink, in order to ensure sufficient coverage. In this case, signals (for example, synchronization signals and/or a broadcast signal) to be received by an unspecified number of user terminals are mapped to a plurality of resources by moving (sweeping) beams.

However, in LTE, the locations of a plurality of synchronization signals (for example, the PSS, SSS, etc.) are defined relative to each other. Therefore, if the same synchronization signal is transmitted in multiple resources, the user terminal may not be able to identify the relative position of this synchronization signal accurately. Also, when performing analog beamforming, it is necessary to change the beam direction in time division.

Also, the random access preamble ("RA preamble," "PRACH," etc.) that is transmitted from a user terminal in random access procedures is also subjected to the receiving process using beam forming, at the radio base station end. In this case, the user terminal needs to transmit the PRACH multiple times, in different resources, in accordance with the sweeping of receiving beams at the radio base station end. In this way, future radio communication systems may employ modes in which certain signals are transmitted multiple times in different resources.

Also, when dynamic TDD (full dynamic TDD) is employed, if DL signals—including the synchronization signals, the broadcast signal, the reference signals (for example, CRSs) and so on are transmitted in the same cycle (which is, for example, five ms) as in existing LTE systems, the UL/DL configurations in dynamic TDD may be limited. For example, if the synchronization signals, the broadcast signals and the reference signals (for example, CRSs) and so on are transmitted in the same way as in LTE systems by applying the above-mentioned beam forming, these signals will be transmitted relatively frequently. Also, transmitting these signals in multiple resources by using beamforming might result in increased overhead.

Also, to allow a user terminal that is in an unconnected state to a network (NW) to gain initial access to a 5G cell (for example, the above scenario (1)), the user terminal has to perform initial access procedures in a state in which the user terminal is unable to recognize the frequency used in each numerology. In this case, the user terminal needs to detect multiple numerology patterns on a blind basis.

If a communication method used in existing LTE systems (for example, initial access procedures) is applied to such future communication systems (for example, 5G) on an as-is basis, there is a possibility that the above-described features of 5G (for example, dynamic TDD) will be limited and the overhead will increase, which is likely to make it difficult to communicate adequately.

Figure 2:
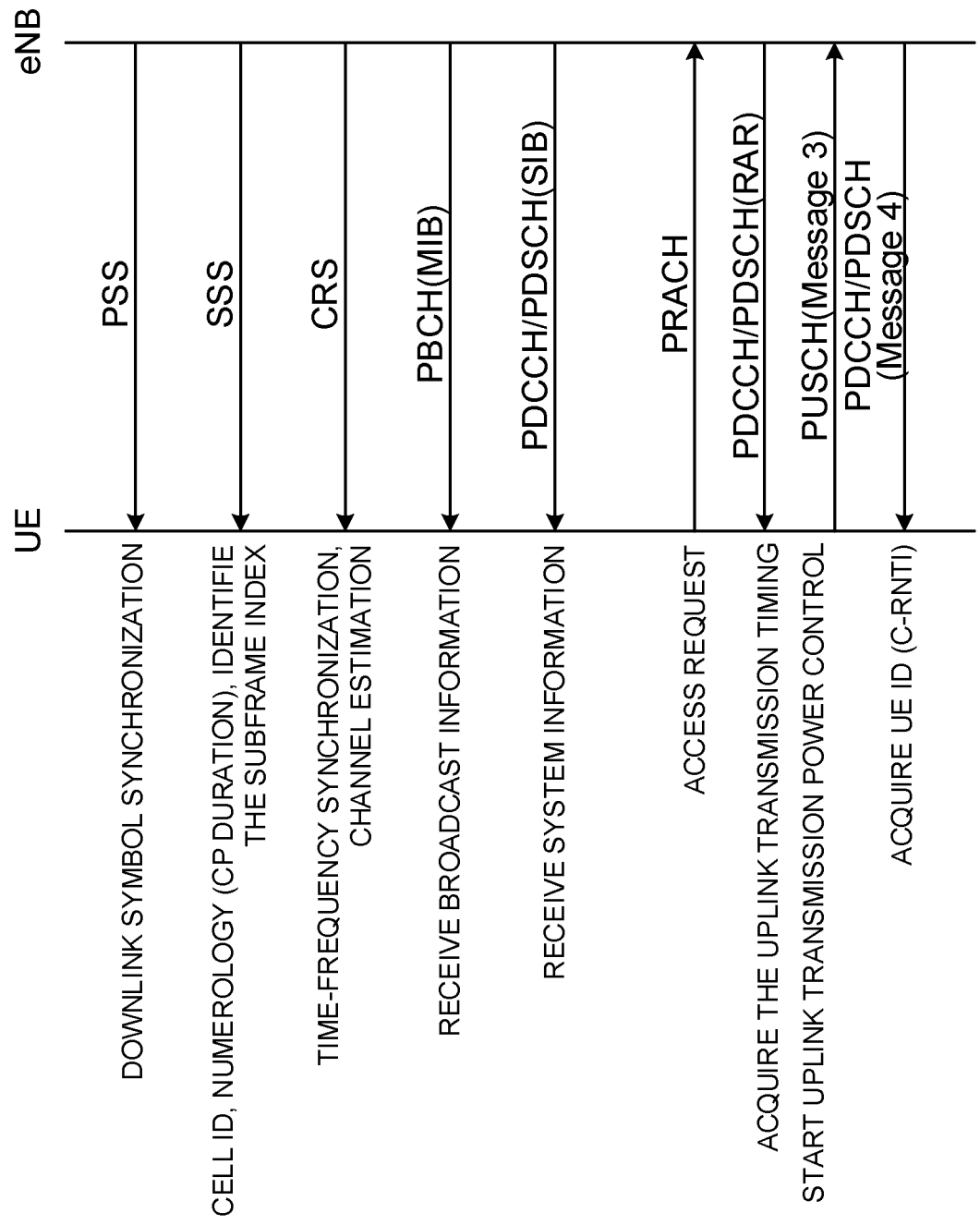
FIG. 2 is a diagram to show an example of initial access procedures in conventional LTE.

FIG. 2 shows an example of initial access procedures in existing LTE systems. First, a user terminal performs the synchronization process (downlink symbol synchronization) based on the PSS, and identifies the cell ID (for example, the PCI (Physical Cell ID)), identifies the numerology (CP duration) and identifies the subframe index, based on the SSS. Next, the user terminal establishes time-frequency synchronization, performs channel estimation and so on, using DL reference signals (CRSs), receives broadcast information (the system bandwidth, the frame index, etc.) via the PBCH (MIB), and then receives system information (whether or not standby is possible, shared channel format, etc.) via the PDCCH/PDSCH (SIBs).

After that, the user terminal performs random access procedures. To be more specific, the user terminal transmits an access request using the PRACH, acquires the uplink transmission timing based on the PDCCH/PDSCH (RAR), and starts uplink transmission power control. Also, as the PUSCH (message 3) is transmitted and the PDCCH/PDSCH (message 4) is received, the ID (C-RNTI) of the user terminal is acquired.

The radio base station needs to transmit the DL signals (PSS, SSS, CRS, etc.), which are used in the first synchronization process (downlink symbol synchronization) and which are used to transmit system information, periodically, without thinking about whether user terminals are present. The problem in this case is that, if the cycle of transmission is lengthened, it might result in increased initial access and/or reconnection delays. Meanwhile, a shortened transmission cycle can lead to imposing limitations on dynamic TDD or lead to the problem of increased overhead.

Therefore, the present inventors have focused on features that may be supported in future radio communication systems (full dynamic TDD, massive BF, multiple numerologies, etc.), and arrived at initial access procedures that take into consideration at least one of these features, as well as signals that are needed in this initial access technique.

For example, a predetermined transmission time unit (TTIs), which is configured on a periodic basis, is fixed for DL, and the transmission of the synchronization signals and the broadcast signal is controlled in this TTI (subframe). The user terminal controls the receiving process (synchronization process and/or the like) assuming that the synchronization signals and the broadcast signal are transmitted in the given TTI configured for DL transmission. In this way, by adopting a structure in which the synchronization signals and the broadcast signal, which are necessary to gain initial access, are transmitted in a given TTI, it is possible to gain initial access properly in future radio communication systems.

Now, embodiments of the present invention will be described in detail below with reference to the accompanying drawings. In the following description, a radio frame that can switch between the downlink (DL) and the uplink (UL) per transmission time interval (TTI) will be shown as an example, but the present embodiment is by no means limited to this. Any format may be applied as long as the synchronization signals and the broadcast signal are transmitted in given TTIs (subframes).

In the following embodiment, the synchronization channel (synchronization signal) may be any signal for use for cell search. For example, the existing primary synchronization signal (PSS) and secondary synchronization signals (SSSs), discovery signals (DSs/DRSs (Discovery Reference Signals)), signals that are provided by enhancing/modifying these synchronization signals (may be referred to as, for example, "enhanced PSS/eSSS" and so on), new signals that are different from these signals, and/or signals combining at least part of these signals may be used as synchronization signals.

(First Aspect)

Based on the first aspect of the present invention, a case will be described below, in which a given TTI, which is configured on a periodic basis, is fixed for DL and the transmission of the synchronization signals and the broadcast signal is controlled in this TTI. The given TTI may be shorter than one ms, and may be referred to as a "short TTI," a "short subframe," and so on.

Figure 3:
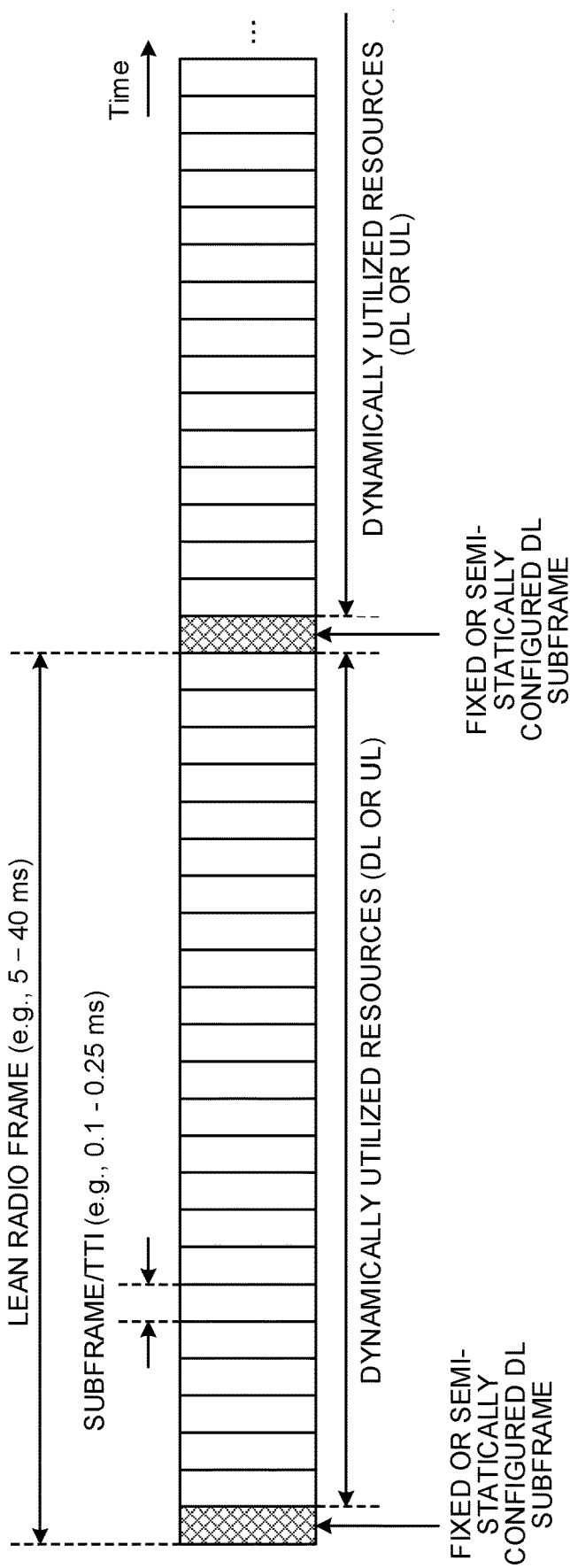
FIG. 3 is a diagram to explain given TTIs in which synchronization signals and a broadcast signal are transmitted.

FIG. 3 shows an example of a radio frame, in which the downlink (DL) and the uplink (UL) can be switched per transmission time interval (TTI). In the example shown here, a radio frame that can switch between DL and UL per TTI is formed with a given TTI (subframe), which is for use for DL transmission, and dynamic TTIs, in which the direction of communication (UL or DL) can be switched dynamically. The radio frame format to allow switching of DL and UL per TTI, which can be applied to the present embodiment, is by no means limited to this. As long as a plurality of TTIs, in which DL and UL can be switched, are at least contained, any radio frame format may be used.

The given TTI may be provided in a given cycle (for example, in a cycle of five ms or more), and may be configured such that dynamic TTIs are provided between the given TTIs. The dynamic TTIs may be referred to as "dynamic TTIs," "flexible TTIs," "dynamic subframes," "dynamic subframes" or "flexible subframes."

A radio base station can transmit the synchronization signals and the broadcast signal using a plurality of resources within a cycle. For example, the radio base station may transmit synchronization signals and/or a broadcast signal, in which the same or different beamforming (precoding) is applied to continuous resources (for example, symbols, subcarriers, REs, etc.) or discontinuous resources. For example, when applying analog beamforming, the radio base station can transmit the synchronization signals and/or the broadcast signal using resources that are temporally discontinuous.

The number of resources that are used to transmit the synchronization signals and/or the broadcast signal within a given TTI may be changed as appropriate. And the radio base station may transmit this information about the number of resources in the broadcast signal. Based on the information about the number of resources included in the broadcast signal, the user terminal can control the receiving process. Also, the user terminal may determine the number of resources (or beam patterns) to use in UL transmission (for example, the PRACH) based on the information about the number of resources, included in the broadcast signal. By this means, the user terminal can perform UL transmission taking into account the number of beams (beam patterns) which the radio base station might apply.

Also, if the user terminal is connected with another base station (for example, an LTE base station and/or another 5G base station), the cycle and/or the timing offset of DL-fixed TTIs in the 5G carrier (new RAT) of initial access (additional access) may be reported from the connecting base station to the user terminal. In this case, the radio base station may report the number of resources (beams) within a cycle in the 5G carrier to the user terminal together. By this means, even if the cycle of the given TTI is configured long, the user terminal can properly receive the synchronization signals, so that the load of the receiving process at the user terminal can be reduced, and the overhead of the synchronization signals and the broadcast signal can be reduced.

Also, in the DL-fixed TTI, which is provided periodically, signals that are different from the synchronization signals and the broadcast signal may be multiplexed with the synchronization signals and the broadcast signal and transmitted, using at least one of TDM, FDM, CDM and SDM.

In this way, by gaining initial access using synchronization signals and broadcast signal included in a given TTI, it is possible to prevent dynamic TDD (dull dynamic TDD), when applied, from limiting DL/UL, and carry out communication. In addition, by using a plurality of resources to transmit and receive the synchronization signals and the broadcast signal, multi-element beamforming can be suitably implemented.

<Resource Mapping Method>

Figure 4:
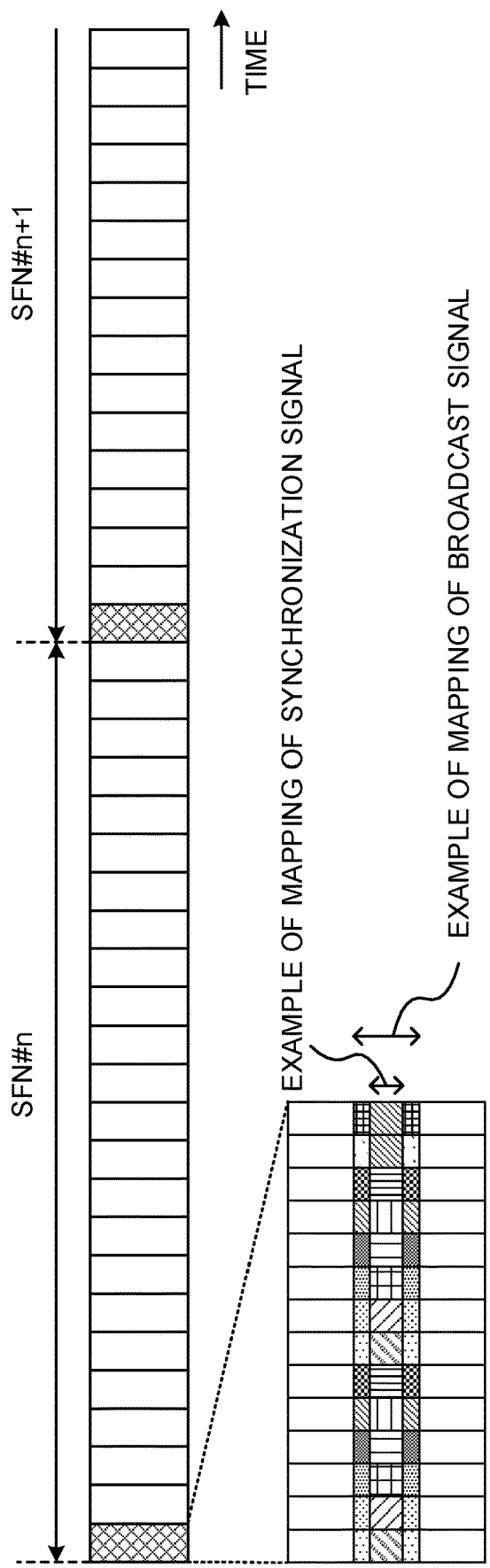
FIG. 4 is a diagram to show an example of the method of mapping synchronization signals and a broadcast signal.

FIG. 4 shows a case where the synchronization signals and the broadcast signal are each mapped to multiple resources within a given TTI. The radio base station can transmit synchronization signals and/or a broadcast signal of one beam (one antenna port) using different resources within a given TTI. Alternatively, the radio base station may map synchronization signals and/or broadcast signals of different beams (different antenna ports) to continuous or non-continuous resources within a given TTI and transmit these.

Also, this mapping may be done so that varying synchronization signal sequences are mapped to each resource. For example, each synchronization signal sequence can be generated based on a symbol index or an RB index. Although FIG. 4 shows a case where, in each symbol, the broadcast signal is mapped (frequency-multiplexed) to adjoin the synchronization signals, the mapping method of the synchronization signals and the broadcast signal is by no means limited to this. The synchronization signals and the broadcast signal may be mapped using time multiplexing or code multiplexing.

The radio base station may report information about the resources included in the synchronization signals and/or the broadcast signal, to the user terminal, in an implicit or explicit manner. For example, when the radio base station maps a plurality of synchronization signals and/or broadcast signals to resources within a given TTI, the radio base station may employ a format in which information related to the resources for use for transmission (for example, resource index information) is included in the synchronization signals and/or the broadcast signal. Also, the radio base station may include time-frequency resource index information (possibly including an SFN index) in the broadcast signals to be mapped to each time-frequency resource and transmit these.

By this means, in whichever resource (beam) the synchronization signals and/or the broadcast signal are detected, the user terminal can identify the subframe index and/or the frame index. In addition, when the user terminal detects the synchronization signals and/or the broadcast signal in a plurality of resources, the user terminal may use a plurality of resources even in UL transmission (for example, PRACH transmission).

<Transmission Per Numerology>

The radio base station can transmit the synchronization signals and/or the broadcast signal in a manner that is suitable for each numerology. That is, the synchronization signals and/or the broadcast signal that pertain to a given numerology and the synchronization signals and/or the broadcast signal that pertain to another numerology may be transmitted based on different configurations (for example, in different resources, in different cycles, and so on).

When synchronization signals are received, the user terminal can decide which numerology to applies, based on these. For example, the user terminal determines and identifies the numerology from the synchronization signals (or from the synchronization signals and known reference signals) on a blind basis.

The user terminal can also configure the numerology obtained from the synchronization signals and/or the broadcast signal as a fundamental numerology for the frequency carrier in which the signals were detected. In this case, unless a report arrives from the radio base station to the effect that a different numerology is configured, the user terminal can communicate using the numerology obtained from the synchronization signals and/or the broadcast signal.

Alternatively, the user terminal may decide the numerology to use for communication based on information related to a given numerology (the numerology specified by the broadcast signal), which is contained in the broadcast signal, rather than based on the numerology obtained from the synchronization signals received. Again, as long as a report to indicate that another numerology is configured does not arrive from the radio base station, the user terminal can be configured to communicate using the numerology specified by the broadcast signal.

In this way, by configuring the numerology obtained from the received synchronization signals and/or broadcast signal as a fundamental numerology and communicating accordingly, it is possible to communicate adequately even in the presence of multiple numerologies.

(Second Aspect)

Based on a second aspect of the present invention, a case will be described below in which the initial access procedures after the synchronization signals and the broadcast signal are received can be switched based on information that is contained in the synchronization signals and/or the broadcast signal. Now, a case will be described below in which the initial access procedures are controlled based on the broadcast signal.

After receiving the synchronization signals and the broadcast signal, the user terminal gains initial access so as to discover and/or measure cells. In this case, the user terminal selects predetermined initial access procedures based on the broadcast signal in receipt. For example, the user terminal can choose initial access procedures in which the random access operation is performed before reference signals or system information is received, or the user terminal can choose initial access procedures in which reference signals or system information is received before the random access operation is made.

Figure 5B:
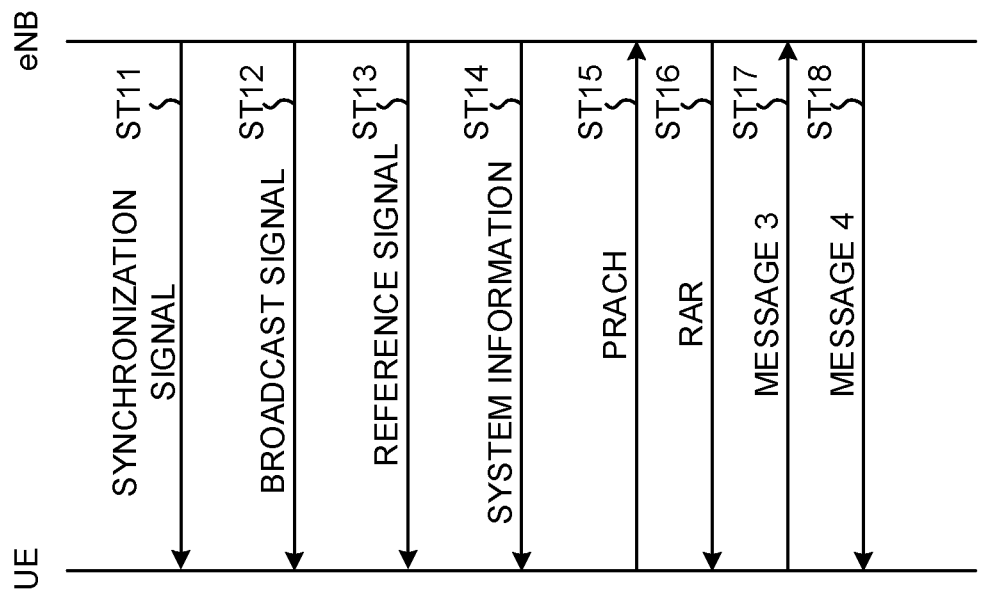
FIGS. 5A and 5B are diagrams to show examples of initial access procedures after synchronization signals and a broadcast signal are received.
Figure 5A:
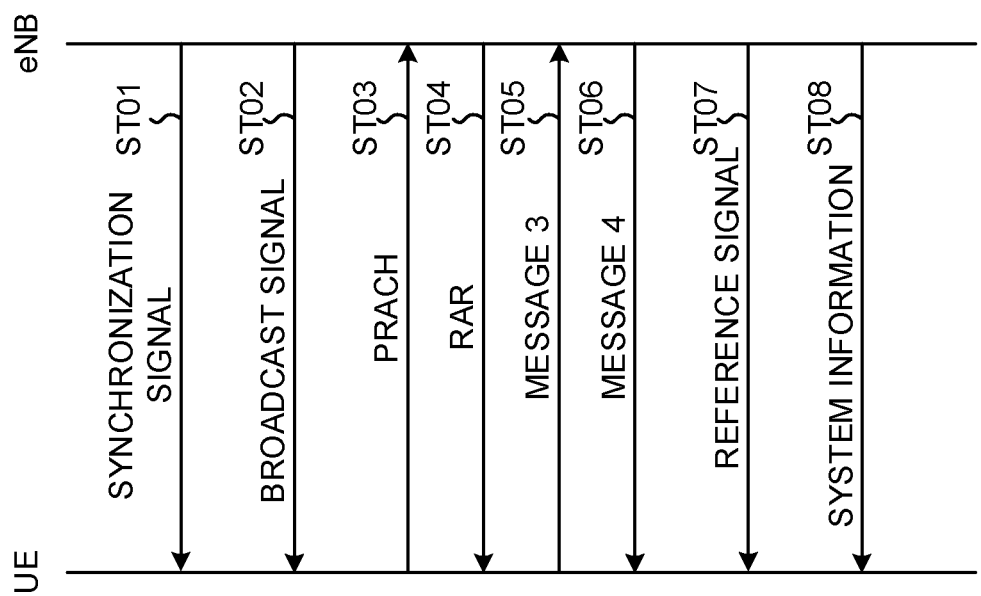

FIG. 5A shows an example of initial access procedures to perform the random access operation prior to receiving reference signals and system information. First, the user terminal detects the synchronization signals transmitted from the radio base station (ST01), and receives the broadcast signal (ST02). As has been described above in relationship to the first aspect of the present invention, when the synchronization signals and the broadcast signal are received in a given TTI, ST01 and ST 02 may be performed at the same time.

Next, the user terminal performs random access procedures. To be more specific, the user terminal acquires a user ID (for example, a C-RNTI) by transmitting a random access preamble (message 1) (ST03), receiving a random access response (message 2) (ST04), sending message 3 (ST05) and receiving message 4 (contention resolution) (ST06). Note that information about the random access preamble can be included in the broadcast signal to be received in ST02 and reported to the user terminal.

Next, the user terminal receives the reference signal for identifying the cell ID and/or the beam ID, transmitted from the radio base station (ST07), and then receives the system information (ST08).

The initial access procedures shown in FIG. 5A can be used suitably for communication using high frequencies. In a cell using a high frequency (for example, a high-frequency small cell, and/or the like), the user terminal may transmit the PRACH first, and then the radio base station, triggered by the transmission of the PRACH, transmits detailed broadcast information (system information), cell measurement signals and so on.

In this way, by employing a structure in which detailed system information and/or the like are transmitted when triggered by PRACH transmission from the user terminal, the overhead can be reduced compared to the case where the radio base station transmits the system information and/or the like periodically. Note that the initial access shown in FIG. 5A is not limited to communication using high frequencies. For example, this initial access can be used in a cell where there are a small number (not more than a predetermined value) of user terminals.

FIG. 5B shows an example of initial access procedures, in which reference signals and system information are received before the random access operation is performed. First, the user terminal detects the synchronization signals transmitted from the radio base station (ST 11), and receives the broadcast signal (ST 12). As has been described above in relationship to the first aspect of the present invention, when the synchronization signals and the broadcast signal are received in a given TTI, ST11 and ST 12 may be performed at the same time.

Next, the user terminal receives the reference signal for identifying the cell ID and/or the beam ID, transmitted from the radio base station (ST13), and then receives the system information (ST14).

Next, the user terminal performs random access procedures. To be more specific, the user terminal acquires a user ID (for example, a C-RNTI) by transmitting a random access preamble (message 1) (ST15), receiving a random access response (message 2) (ST16), sending message 3 (ST17) and receiving message 4 (contention resolution) (ST18). Note that information about the random access preamble can be included in the system information to be received in ST14 and reported to the user terminal.

The initial access procedures shown in FIG. 5B can be used suitably for communication using low frequencies. In a cell using a low frequency (for example, a low-frequency macrocell, a microcell, etc.), it is possible that the radio base station transmits broadcast information and measurement reference signals periodically. In this case, the user terminal may be configured to perform random access procedures after receiving the measurement reference signals, system information and so on, transmitted from the radio base station.

For example, when there are many user terminals in the cell, it is preferable that the radio base station transmits system information and reference signals more on a regular basis, so that the initial access procedures shown in FIG. 5B can be used suitably. Note that the initial access shown in FIG. 5B is not limited to communication using low frequencies.

(Third Aspect)

Based on a third aspect of the present invention, the initial access operation for a user terminal that is already connected with another cell (or NW) (for example, in the above-mentioned scenarios (2) and (3) of initial access) will be explained.

When a user terminal is already connected with another cell (for example, an LTE cell, a 5G cell, etc.), information that the user terminal can use to gain initial access (additional connection) can be reported from another cell to the user terminal. For example, the radio base station connected with the user terminal can report, to the user terminal, at least one of broadcast information that pertains to the numerology of the cell where the user terminal intends to additionally connect (information included in the broadcast signal), system information, information related to the synchronization signals, and the user identifier (for example, C-RNTI) for use in the cell where the user terminal intends to additionally connect.

The synchronization signal-related information can be information related to at least one of the transmission timing offset for the synchronization signals, the cycle (subframe index), the number of resources (beams), and information about the access procedures. Also, the synchronization signals may be configured to include information (for example, beam IDs) for specifying the cell where the user terminal intends to connect (additionally).

When the information which the user terminal can use to gain initial access is configured (received) from another cell, the user terminal controls the access process for the new numerology according to the information about the configurations (for example, the number of beams) in the cell where the user terminal intends to connect, and/or the information about the access procedures, included in the received information. For example, the user terminal decides, based on the information reported from the other cell, whether to perform the random access operation (for example, PRACH transmission) first, or receive the downlink beam RSs first (initial access procedure). Alternatively, the user terminal decides how many resources to use to transmit the PRACH and/or to receive the beam RSs, based on the information reported from the other cell.

In this way, a user terminal that is connected to another cell performs the process of accessing a new cell (numerology) based on information reported from the other cell, so that the access procedures can be simplified by performing.

(Radio Communication System)

Now, the structure of a radio communication system according to one embodiment of the present invention will be described below. In this radio communication system, the radio communication method according to one and/or a combination of the above-described embodiments of the present invention is employed.

Figure 6:
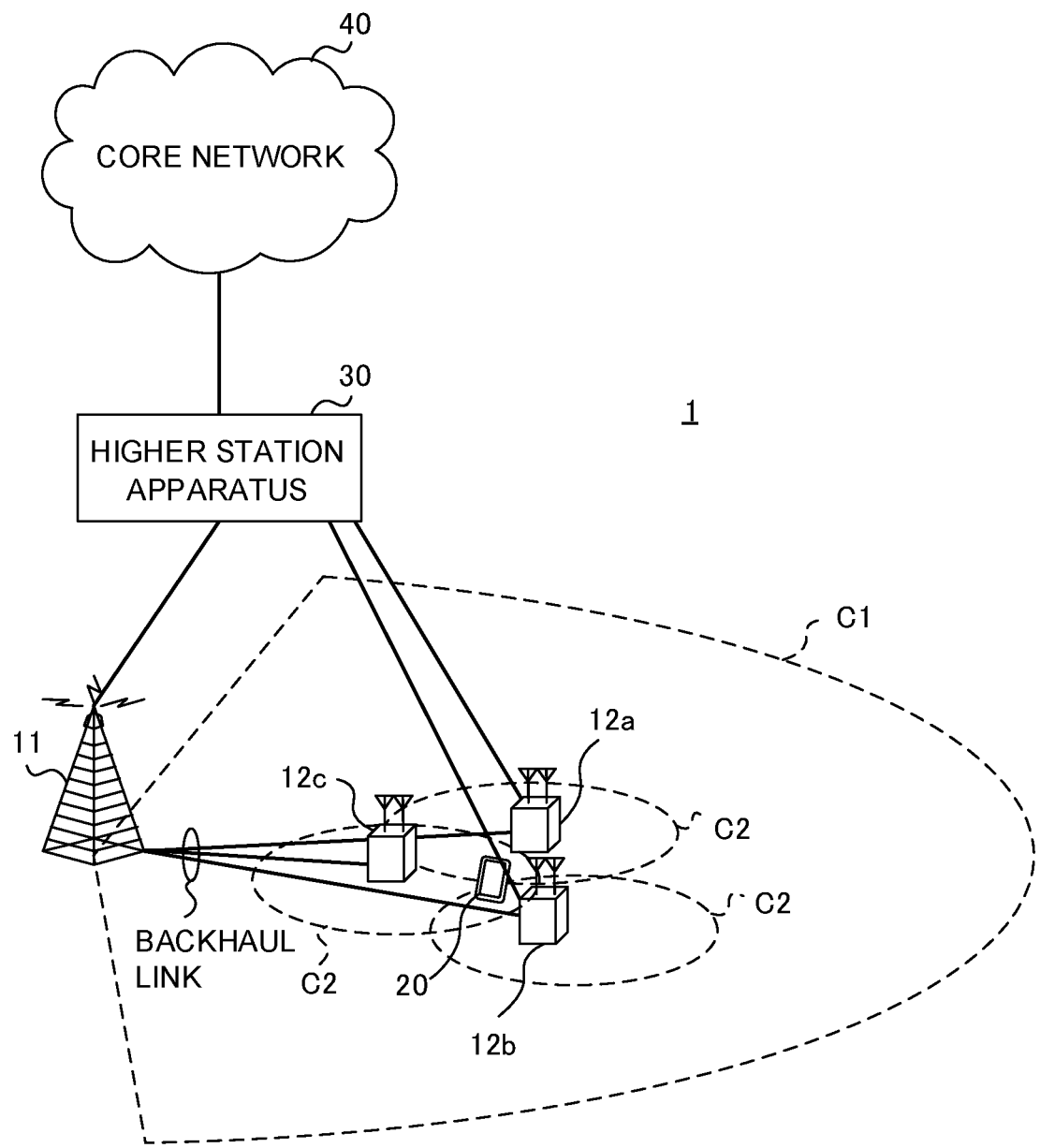
FIG. 6 is a diagram to show an example of a schematic structure of a radio communication system according to one embodiment of the present invention.

FIG. 6 is a diagram to show an example of a schematic structure of a radio communication system according to an embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 is may be referred to as "LTE (Long Term Evolution)," "LTE-A (LTE-Advanced)," "LTE-B (LTE-Beyond)," "SUPER 3 G," "IMT-Advanced," "4G (4th generation mobile communication system)," "5G (5th generation mobile communication system)," "FRA (Future Radio Access)," "new RAT (Radio Access Technology)" and so on, or may be seen as a system to implement these.

The radio communication system 1 shown in FIG. 6 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier (for example, a 5G RAT carrier) of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, orthogonal frequency division multiple access (OFDMA) is applied to the downlink, and single-carrier frequency division multiple access (SC-FDMA) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. Delivery acknowledgment information (also referred to as, for example, "retransmission control information," "HARQ-ACKs," "ACK/NACKs," etc.) of HARQ (Hybrid Automatic Repeat reQuest) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Furthermore, uplink control information (UCI) to include at least one of downlink radio quality information (CQI: Channel Quality Indicator), delivery acknowledgment information and so on is communicated through the PUCCH. By means of the PRACH, random access preambles for establishing connections with cells are communicated.

In the radio communication systems 1, cell-specific reference signal (CRSs), channel state information reference signal (CSI-RSs), demodulation reference signal (DMRSs), positioning reference signal (PRSs) and so on are communicated as downlink reference signals. Also, in the radio communication system 1, measurement reference signals (SRSs: Sounding Reference Signals), demodulation reference signals (DMRSs) and so on are communicated as uplink reference signals. Note that the DMRS may be referred to as a "user terminal-specific reference signal (UE-specific Reference Signal)." Also, the reference signals to be communicated are by no means limited to these.

<Radio Base Station>

Figure 7:
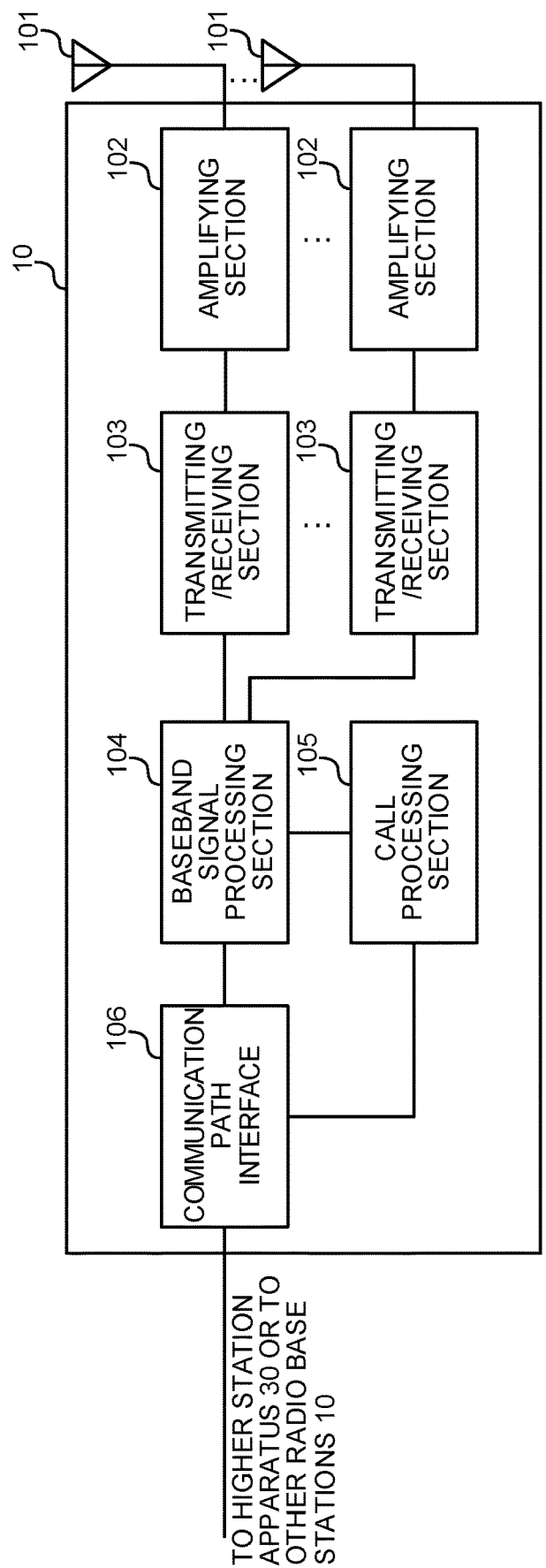
FIG. 7 is a diagram to show an example of an overall structure of a radio base station according to one embodiment of the present invention.

FIG. 7 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section. The transmitting/receiving sections 103 transmit, for example, the synchronization signals or the broadcast signal to the user terminal 20.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit the synchronization signals and the broadcast signal to the user terminal 20 in given TTIs (for example, fixed DL subframes) that are configured in a given cycle. The transmitting/receiving sections 103 may map and transmit the synchronization signals and/or the broadcast signal in a plurality of different resources. In this case, the transmitting/receiving sections 103 can transmit the synchronization signals and/or the broadcast signal mapped to each resource by applying the same beam forming (precoding) or different beam forming. Also, the transmitting/receiving sections 103 may include and transmit information about the resources that are used to transmit the synchronization signals and/or the broadcast signal, in the synchronization signals and/or the broadcast signal. For example, the synchronization signals may be configured so that synchronization signal sequences are generated based on the resources where the synchronization signals are mapped (for example, based on symbol indices, RB indices, etc.).

Also, the transmitting/receiving sections 103 may receive random access preambles, message 3, measurement reports and so on, from the user terminal 20.

Figure 8:
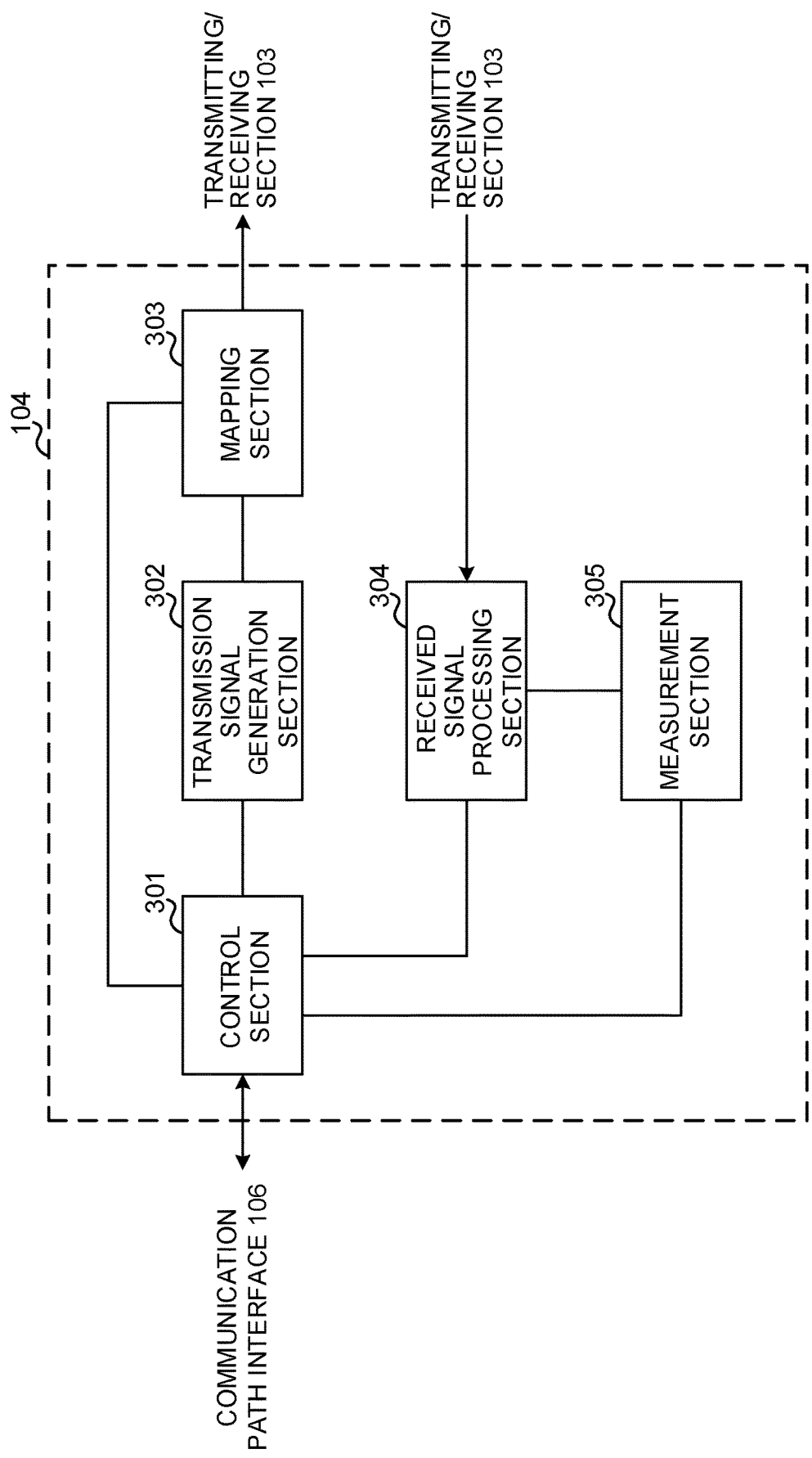
FIG. 8 is a diagram to show an example of a functional structure of a radio base station according to one embodiment of the present invention.

FIG. 8 is a diagram to show an example of functional structure of a radio base station according to one embodiment of the present invention. Note that, although FIG. 8 primarily shows functional blocks that pertain to characteristic parts of the present embodiment, the radio base station 10 has other functional blocks that are necessary for radio communication as well. As shown in FIG. 8, the baseband signal processing section 104 at least has a control section (scheduler) 301, a transmission signal generating section 302, a mapping section 303, a received signal processing section 304 and a measurement section 305.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted on the PDSCH and downlink control signals that are transmitted on the PDCCH and/or the EPDCCH. Also, the control section 301 controls the scheduling of downlink reference signals such as synchronization signals (the PSS (Primary Synchronization Signal) and the SSS (Secondary Synchronization Signal)), the CRS, the CSI-RS, the DM-RS and so on.

In addition, the control section 301 controls the scheduling of uplink data signals that are transmitted in the PUSCH, uplink control signals that are transmitted in the PUCCH and/or the PUSCH (for example, delivery acknowledgment information), random access preambles that are transmitted in the PRACH, uplink reference signals, and so on.

In particular, the control section 301 controls the radio base station 10 to communicate by using a predetermined radio access scheme (for example, LTE RAT, 5G RAT, etc.). The control section 301 exerts control so that signals are transmitted and received according to the numerology that applies to the radio access scheme used for communication.

The control section 301 controls communication using radio frames that include a plurality of TTIs in which the downlink and the uplink can be switched, and a given TTI, which is for DL transmission and which is configured in a given cycle. For example, the control section 301 controls the transmission of synchronization signals and broadcast signal in the given TTI that is configured in a given cycle.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure, for example, the received power (for example, RSRP (Reference Signal Received Power)), the received signal strength (for example, RSSI (Received Signal Strength Indicator)), the received quality (for example, RSRQ (Reference Signal Received Quality)), the channel state, and so on, of the received signal. The measurement results may be output to the control section 301.

(User Terminal)

Figure 9:
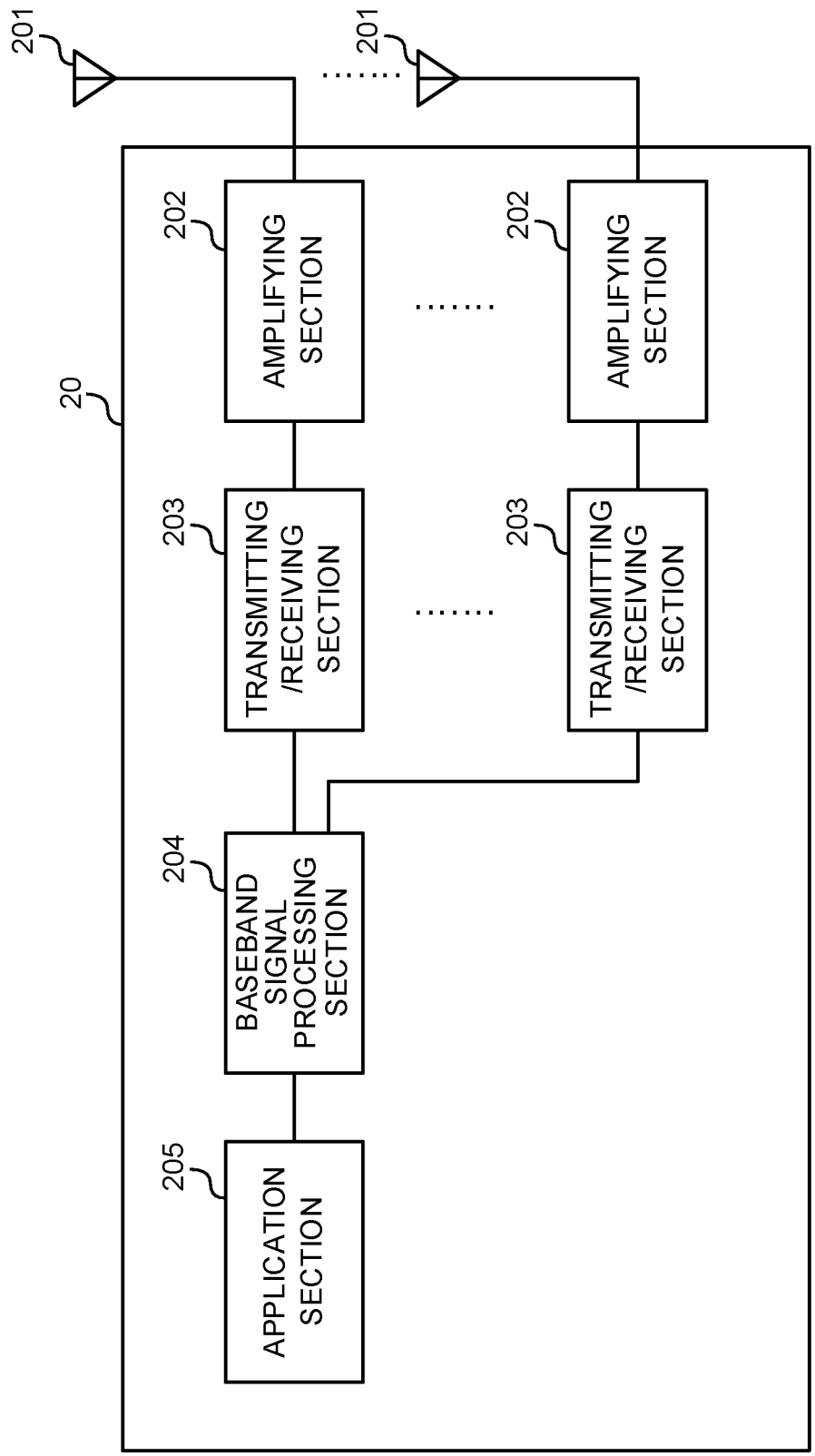
FIG. 9 is a diagram to show an example of an overall structure of a user terminal according to one embodiment of the present invention.

FIG. 9 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals (for example, the synchronization signals or the broadcast signal) amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive the synchronization signals and the broadcast signal in a given TTI that is configured in a given cycle. For example, the transmitting/receiving sections 203 receive a plurality of synchronization signals and/or broadcast signals allocated to different resources in a given TTI. The transmitting/receiving sections 203 receive information about the resources that were used to transmit the synchronization signals and/or the broadcast signals in receipt. The transmitting/receiving sections 203 may transmit random access preambles, message 3, measurement reports and so on, to the radio base station 10.

Figure 10:
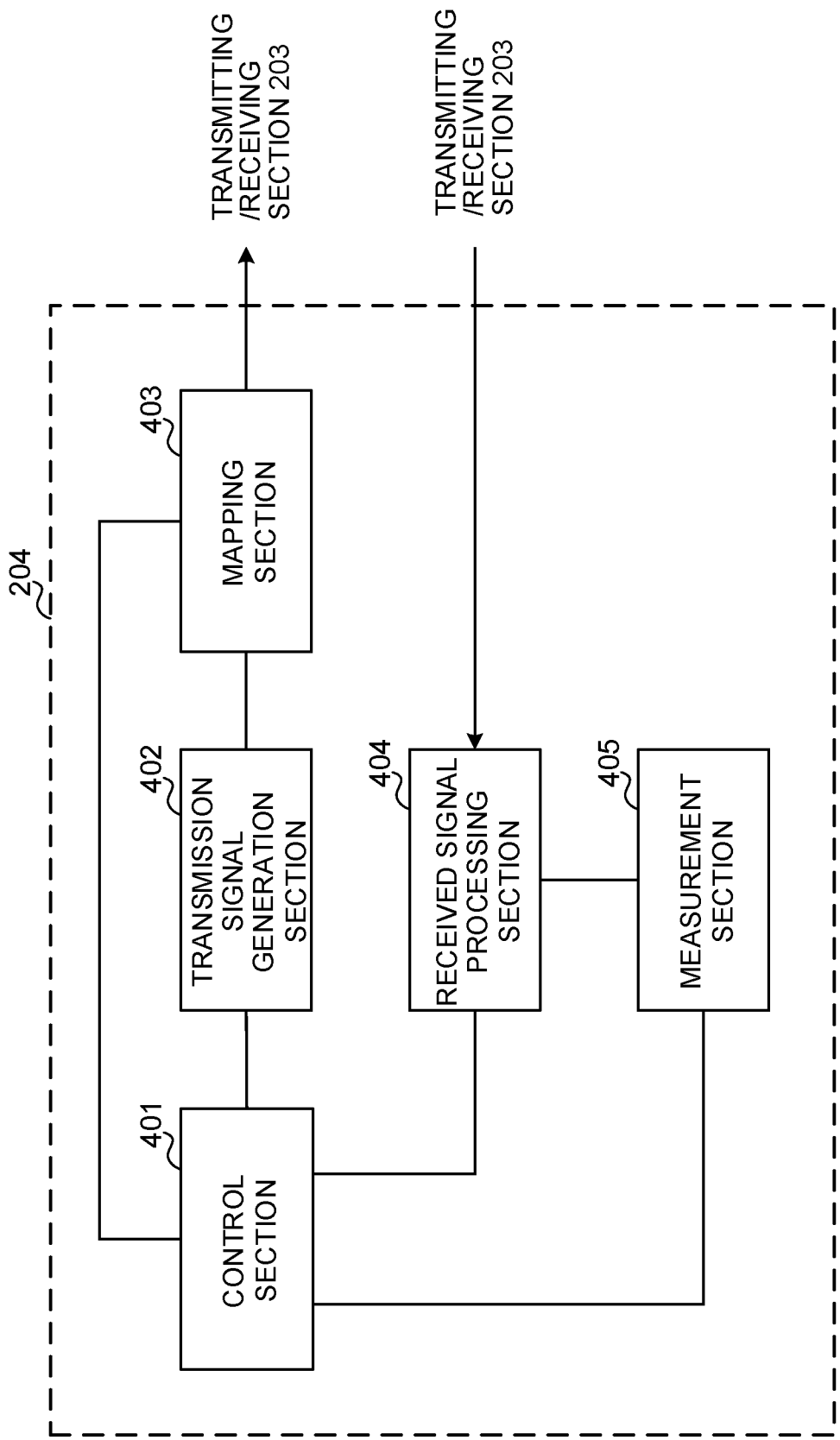
FIG. 10 is a diagram to show an example of a functional structure of a user terminal according to an embodiment of the present invention.

FIG. 10 is a diagram to show an example of a functional structure of a user terminal according to one embodiment of the present invention. Note that, although FIG. 10 primarily shows functional blocks that pertain to characteristic parts of the present embodiment, the user terminal 20 has other functional blocks that are necessary for radio communication as well. As shown in FIG. 10, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, via the received signal processing section 404. The control section 401 controls the generation of uplink control signals (for example, delivery acknowledgement information and so on) and/or uplink data signals based on the results of deciding whether or not retransmission control is necessary for the downlink control signals and/or downlink data signals, and so on.

To be more specific, the control section 401 controls the user terminal 20 to communicate by using a predetermined radio access scheme (for example, LTE RAT, 5G RAT, and so on). The control section 401 specifies the numerology that applies to the radio access scheme used for communication, and controls the transmission and receipt of signals in accordance with the numerology.

The control section 401 controls communication by using radio frames that include a plurality of TTIs, in which the downlink and the uplink can be switched, and a given TTI, which is for DL transmission and which is configured in a given cycle. For example, the control section 401 controls the receipt of the synchronization signals and the broadcast signal in a given TTI that is configured in a given cycle (see FIG. 3). Furthermore, the control section 401 controls the receipt of a plurality of synchronization signals and/or broadcast signals allocated to different resources in a given TTI. Also, the control section 401 determines the numerology to use for communication based on the synchronization signals and/or broadcast signals in receipt. In addition, the control section 401 switches and controls the initial access procedures based on the broadcast signal received (see FIG. 5).

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving section 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received signal strength (for example, RSSI), the received quality (for example, RSRQ), the channel state and so on, of the received signal. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with 1 piece of physically-integrated apparatus, or may be implemented by connecting 2 physically-separate pieces of apparatus via radio or wire and by using these multiple pieces of apparatus.

Figure 11:
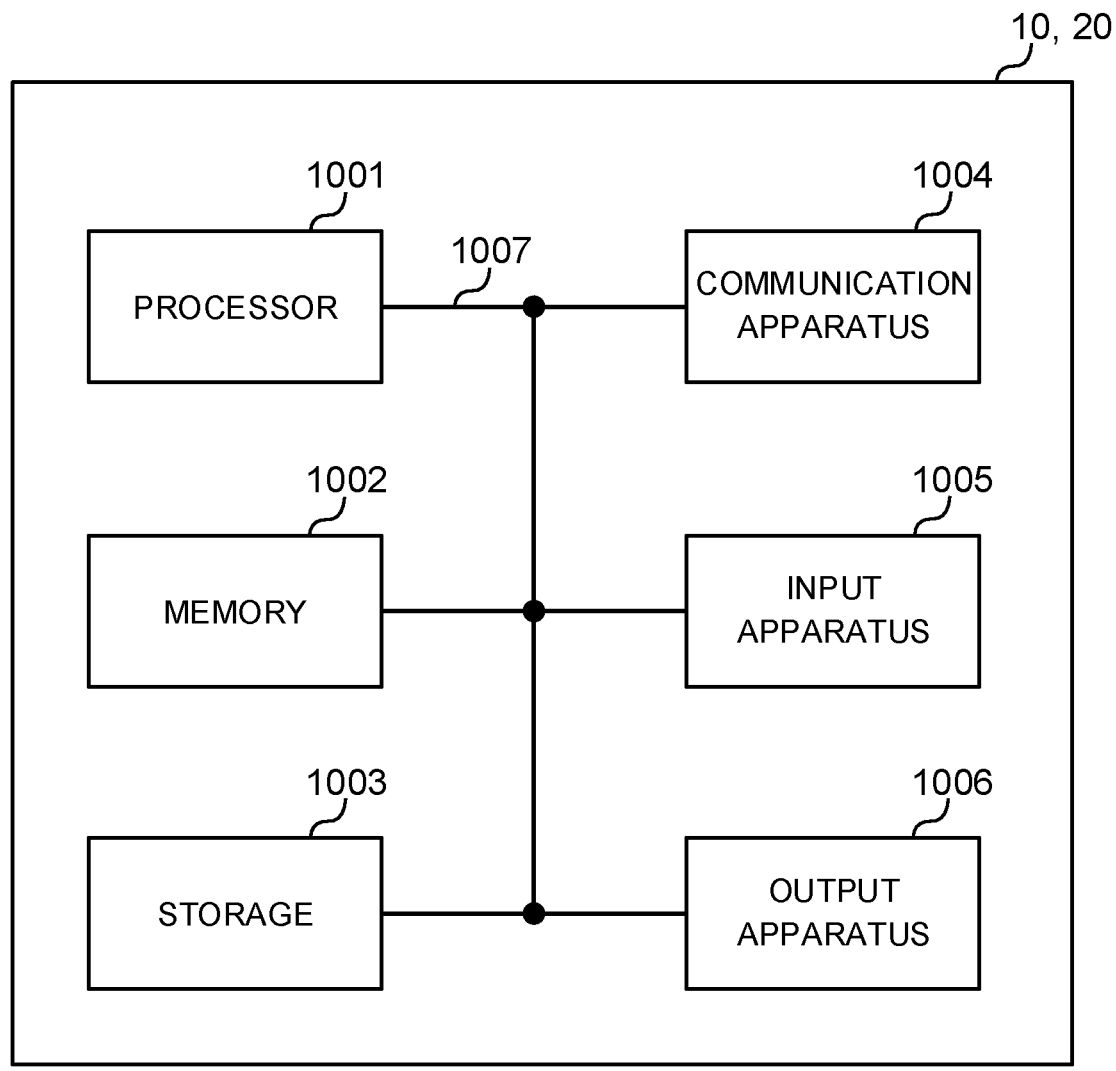
FIG. 11 is a diagram to show an example hardware structure of a radio base station and a user terminal according to one embodiment of the present invention.

That is, a radio base station, a user terminal and so on according to an embodiment of the present invention may function as a computer that executes the processes of the radio communication method of the present invention. FIG. 11 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), a RAM (Random Access Memory) and so on. The memory 1002 may be referred to as a "register," a "cache," a "main memory (primary storage apparatus)" and so on. The memory 1002 can store executable programs (program codes), software modules and the like for implementing the radio communication methods according to one embodiment of the present invention.

The storage 1003 is a computer-readable recording medium, and is configured with at least one of an optical disk such as a CD-ROM (Compact Disc ROM), a hard disk drive, a flexible disk, a magneto-optical disk, a flash memory and so on. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for sending output to the outside (for example, a display, a speaker, etc.). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." Furthermore, a "component carrier (CC)" may be referred to as a "cell," a "frequency carrier," a "carrier frequency" and so on.

Furthermore, a radio frame may be composed of one or more periods (frames) in the time domain. Each of one or more periods (frames) constituting a radio frame may be referred to as a "subframe." Furthermore, a subframe may be composed of one or more slots in the time domain. Furthermore, a slot may be comprised of 1 or multiple symbols (OFDM symbols, SC-FDMA symbols, etc.) in the time domain.

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (one ms) in existing LTE, may be a shorter period than one ms (for example, one to thirteen symbols), or may be a longer period of time than one ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this.

A TTI having a time duration of one ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be composed of one or more resource blocks. Note that an RB may be referred to as a "physical resource block (PRB: Physical RB)," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) length can be variously changed.

Also, the information and parameters described in this specification may be represented in absolute values or in relative values with respect to predetermined values, or may be represented in other information formats. For example, radio resources may be specified by predetermined indices.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

The examples/embodiments illustrated in this specification may be used individually or in combinations, which may be switched depending on the mode of implementation. Also, predetermined information (for example, reporting of information to the effect that "X holds") does not necessarily have to be reported explicitly, and can be reported in an implicit manner (by, for example, not reporting this piece of information).

Reporting of information is by no means limited to the examples/embodiments described in this specification, and other methods may be used as well. For example, reporting of information may be implemented by using physical layer signaling (for example, DCI (Downlink Control Information), UCI (Uplink Control Information)), higher layer signaling (for example, RRC (Radio Resource Control) signaling, broadcast information (the MIB (Master Information Block) and SIBs (System Information Blocks) and so on) and MAC (Medium Access Control) signaling, other signals or combinations of these. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), new RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-062596, filed on Mar. 25, 2016, including the specification, drawings and abstract, is incorporated herein by reference in its entirety.

The invention claimed is:

1. A terminal comprising:
a receiver that receives a plurality of synchronization signals and a plurality of broadcast signals in a given transmission time interval in which given resources are configured, each given resource being formed of consecutive symbols; and
a processor that controls reception of the plurality of synchronization signals and the plurality of broadcast signals in the given transmission time interval in which the given resources are configured,
wherein the processor is configured to be provided with resource index information of the given resources being configured in the given transmission time interval in which the receiver receives the plurality of synchronization signals and the plurality of broadcast signals, each given resource is used for transmitting synchronization signals among the plurality of synchronization signals and a broadcast signal among the plurality of broadcast signals in the given transmission time interval, and to control reception of the synchronization signals and the broadcast signal on each given resource based on the resource index information of the given resources,
wherein the processor determines a number of resources used for Random Access Channel (RACH) transmission based on a number of the given resources in the given transmission time interval, and
wherein the number of resources is determined based on the information about the number of the given resources based on the broadcast signal.

2. A radio communication method for a terminal, comprising:
receiving a plurality of synchronization signals and a plurality of broadcast signals in a given transmission time interval in which given resources are configured, each given resource being formed of consecutive symbols; and
controlling reception of the plurality of synchronization signals and the plurality of broadcast signals in the given transmission time interval in which the given resources are configured,
wherein the terminal is configured to be provided with resource index information of the given resources being configured in the given transmission time interval in which the terminal receives the plurality of synchronization signals and the plurality of broadcast signals, each given resource is used for transmitting synchronization signals among the plurality of synchronization signals and a broadcast signal among the plurality of broadcast signals in the given transmission time interval, and to control reception of the synchronization signals and the broadcast signal on each given resource based on the resource index information of the given resources,
wherein the terminal determines a number of resources used for Random Access Channel (RACH) transmission based on a number of the given resources in the given transmission time interval, and
wherein the number of resources is determined based on the information about the number of the given resources based on the broadcast signal.

3. A base station comprising:
a transmitter that transmits a plurality of synchronization signals and a plurality of broadcast signals in a given transmission time interval in which given resources are configured, each given resource being formed of consecutive symbols; and
a processor that controls transmission of the plurality of synchronization signals and the plurality of broadcast signals in the given transmission time interval in which the given resources are configured,
wherein the processor is configured to provide a terminal with resource index information of the given resources being configured in the given transmission time interval in which the transmitter transmits the plurality of synchronization signals and the plurality of broadcast signals, each given resource is used for transmitting synchronization signals among the plurality of synchronization signals and a broadcast signal among the plurality of broadcast signals in the given transmission time interval, and to control transmission of the synchronization signals and the broadcast signal on each given resource based on the resource index information of the given resources, and wherein the transmitter transmits information about a number of the given resources in the given transmission time interval to the terminal by the broadcast signal, and wherein a number of resources for the terminal to transmit Random Access Channel (RACH) is determined based on the information about the number of the given resources based on the broadcast signal.

4. A system comprising: a terminal; and a base station, the terminal comprising:
   a receiver that receives a plurality of synchronization signals and a plurality of broadcast signals in a given transmission time interval in which given resources are configured, each given resource being formed of consecutive symbols; and
   a terminal processor that controls reception of the plurality of synchronization signals and the plurality of broadcast signals in the given transmission time interval in which the given resources are configured,
   wherein the terminal processor is configured to be provided with resource index information of the given resources being configured in the given transmission time interval in which the receiver receives the plurality of synchronization signals and the plurality of broadcast signals, each given resource is used for transmitting synchronization signals among the plurality of synchronization signals and a broadcast signal among the plurality of broadcast signals in the given transmission time interval, and to control reception of the synchronization signals and the broadcast signal on each given resource based on the resource index information of the given resources,
   wherein the terminal determines a number of resources used for Random Access Channel (RACH) transmission based on a number of the given resources in the given transmission time interval, and
   wherein the number of resources is determined based on the information about the number of the given resources based on the broadcast signal;
the base station comprising:
   a transmitter that transmits the plurality of synchronization signals and the plurality of broadcast signals in the given transmission time interval in which the given resources are configured; and
   a base station processor that controls transmission of the plurality of synchronization signals and the plurality of broadcast signals in the given transmission time interval in which the given resources are configured,
   wherein the base station processor is configured to provide the terminal with the resource index information of the given resources.

* * * * *